United States Patent [19]

Reale

[11] Patent Number: 4,853,719

[45] Date of Patent: Aug. 1, 1989

[54] COATED ION PROJECTION PRINTING HEAD

[75] Inventor: Louis Reale, Rochester, N.Y.

[73] Assignee: Xerox Corporation, Stamford, Conn.

[21] Appl. No.: 284,225

[22] Filed: Dec. 14, 1988

[51] Int. Cl.[4] .............. G01D 15/00

[52] U.S. Cl. .............. 346/155; 346/150

[58] Field of Search .............. 346/155, 139 R, 139 L, 346/153.1, 150; 358/300; 400/119; 250/423 R, 396 R

[56] References Cited

U.S. PATENT DOCUMENTS

| | | | |
|---|---|---|---|
| 3,675,096 | 7/1972 | Kiess | 317/262 A |
| 4,064,074 | 12/1977 | Ellis | 252/506 |
| 4,086,650 | 4/1978 | Davis et al. | 361/229 |
| 4,463,363 | 7/1984 | Gundlach et al. | 346/159 |
| 4,524,371 | 6/1985 | Sheridan et al. | 346/159 |
| 4,585,320 | 4/1986 | Altauela et al. | 355/3 CH |
| 4,585,321 | 4/1986 | Toshimitsu | 355/3 CH |
| 4,585,322 | 4/1986 | Reale | 355/3 CH |
| 4,585,323 | 4/1986 | Ewing | 355/3 CH |
| 4,644,373 | 2/1987 | Sheridan et al. | 346/159 |
| 4,646,196 | 2/1987 | Reale | 361/230 |
| 4,727,388 | 2/1988 | Sheridan et al. | 346/159 |
| 4,779,107 | 10/1988 | Weisfield et al. | 346/159 |
| 4,923,697 | 12/1975 | Ellis | 252/506 |

*Primary Examiner*—Arthur G. Evans

[57] ABSTRACT

A fluid flow assisted ion projection printing head having an electrically conductive metal body defining an elongated ion generation chamber, a corona wire supported within said chamber for generating ions, an entrance channel in the body for introducing transport fluid to the chamber, an exit channel at least a portion of which is defined by the body for directing transporting fluid with entrained ions from the chamber, and modulation means for neutralizing ions in selected portions of the exiting entraining fluid has substantially all surfaces thereof effected by the extended exposure to the chemistry of the corona discharge coated with a substantially continuous thin conductive film of aluminum hydroxide containing conductive particles. In a preferred embodiment, the conductive metal is aluminum and the conductive particles are graphite particles.

18 Claims, 5 Drawing Sheets

COATED ION PROJECTION PRINTING HEAD

CROSS REFERENCE TO RELATED APPLICATIONS

Reference is hereby made to my following copending applications filed concurrently herewith: U.S. Ser. No. 07/284224 entitled "Long Life Corona Charging Device" (D/86093).

Reference is also made to copending application Ser. No. 002,100 entitled "Corona Device Having a Beryllium Copper Screen" filed Jan. 12, 1987 in the name of Lang et al.

BACKGROUND OF THE INVENTION

The present invention relates to an improved, low cost, fluid flow assisted ion projection printing head which has surfaces effected by extended exposure to the chemistry of the corona discharge coated with an aluminum hydroxide film.

One approach to providing a reliable high resolution on contact printing system is the fluid assisted ion projection printing which in one form entails depositing electrostatic charges in a latent image pattern directly upon a charge receptor surface and then rendering the charge pattern visible in some known manner. Typically, ion protection printing comprises the generation of ions in an ion stream and the control of the ions which may reach a charge receiving surface.

In two patents assigned to the same assignee as the instant application, there are disclosed different forms of a fluid jet assisted ion projection printing apparatus. In each of U.S. Pat. No. 4,463,363 entitled "Fluid Jet Assisted Ion Projection Printing" (Robert W. Gundlach and Richard L. Bergen) and U.S. Pat. No. 4,524,371 entitled "Modulation Structure for Fluid Jet Assisted Ion Projection Printing Apparatus" ((Nicholas K. Sheridon and Michael A. Berkovitz), there is disclosed an ion generation chamber through which air is moved for entraining ions generated therein and for transporting them through an exit channel including an ion modulation region for subsequent deposition upon a latent image receptor. In U.S. Pat. No. 4,463,363, the entire exit channel, including the modulation region, forms a straight path extending from the ion generation chamber to the image receptor. In U.S. Pat. No. 4,524,371, the improvement over the U.S. Pat. No. 4,463,363 structure resides in the exit channel defining a bent path through which the ions flow, in order to allow the ion modulation control elements to be fabricated upon a planar substrate.

In both of these patents, the ion generation chamber is formed as a substantially cylindrical cavity within which the corona wire is centrally located. It was believed that the cylindrical configuration was necessary in order to obtain a stable corona discharge from the corona wire. The high electrical fields established between the axially mounted corona wire, maintained at several thousands volts d.c., and the equidistant conductive walls of the cavity, were expected to cause arcing to any portion of the cavity walls which were nonsmooth or to any corners therein where electrical lines of force would be concentrated.

In a third patent, also assigned to the same assignee as the instant application, U.S. Pat. No. 4,644,373, entitled "Fluid Assisted Ion Projection Printing Head" (Nicholas K. Sheridan, Gerhard K. Sander) an improved ion projection printing head is described. In this embodiment the printing head comprises a one piece conductive body which may be easily cast and which mates with a substantially flat conductive plate against which a second planar member supporting electronic control elements is held. The corona wire is located closer to the conductive wall and the conductive plate than to any of the other walls of the ion generating chamber for concentrating the major portion of the electrical field between the wire and these elements as opposed to any other portions of the chamber walls when the wire is connected to a source of electrical potential.

Typically, these printing heads are made by casting electrically conductive material such as stainless steel which although satisfactory in most respects is also very expensive compared to other conductive materials that are available. The use of die cast aluminum, for example, in place of die cast stainless steel would reduce the expense of the printing head by more than 50%, if not 75%. Aluminum, however, suffers from the problem that it is effected by extended exposure to the chemistry of the corona discharge in that it oxidizes after a relatively short period of time of from about 4 to 10 hours forming an insulating aluminum oxide film which builds up as a preceptable film on the printing head thereby reducing the total output ion current to an unacceptable level. The problems with aluminum are further compounded by the fact that ammonia is a common low level pollutant in most atmospheres and that in the presence of corona discharge the oxygen and nitrogen in the air combine with the ammonia to form ammonium nitrate which deposits on the printing head as a visible white powder or whisker. While similar difficulties exist with regard to the formation of the ammonium and potassium nitrate on a stainless steel head, they are not to the degree found with the use of an aluminum head because the difficulty is exacerbated by the formation of an aluminum oxide film on the head.

In an attempt to avoid these difficulties, various proposals have been made for the use of ammonia filters to rid the atmosphere of ammonia which would otherwise combine with the oxygen and nitrogen under the influence of the corona discharge. In addition gold has been used to provide an inert conductive film on the printing head. Such a film, however, like the stainless steel, is highly susceptible to the formation of a ammonium nitrate deposits which reduce the ion current to an acceptably low level.

PRIOR ART

U.S. Pat. No. 4,646,196 to Reale describes a corona generating device for depositing negative charge which comprises at least one element adjacent the corona discharge electrode having a coating of substantially continuous thin conductive dry film of aluminum hydroxide with conductive particles such as graphite which is capable of neutralizing nitrogen oxide species which may be generated when the corona generating device is energized.

SUMMARY OF THE INVENTION

In accordance with the principle aspect of the present invention, a fluid flow assisted ion projection printing head comprising an electrically conductive metal body defining an elongated ion generation chamber, a conductive corona wire supported within said chamber for generating ions, an entrance channel in the body for introducing transport fluid to said chamber, an exit channel at least a portion of which is defined by the body for directing transporting fluid with entrained ions from said chamber, modulation means for neutralizing ions in selected portions of the exiting entraining fluid has substantially all surfaces thereof effected by the extended exposure to the chemistry of the corona discharge coated with a substantially continuous thin conductive film of aluminum hydroxide containing conductive particles. In a further aspect of the present invention, the film is from 0.3 to about 1.0 mil in thickness and the aluminum hydroxide exists as the unhydrated oxide, a hydrated oxide, aluminum hydroxide are mixtures thereof.

In a further aspect of the present invention, the conductive particles are graphite particles having a maximum dimension less than about 5 micrometers.

In a further aspect of the present invention, the aluminum oxide-hydration to graphite weight ratio is from about 1.5 to about 2.2.

In a further aspect of the present invention, the printing head is made from one piece cast aluminum.

In a further aspect of the present invention, the coating is present on the surface of the ion generation chamber and at least a portion of the exit channel.

In a further principle aspect of the present invention, the corona wire extends in the direction of the elongated chamber and is enclosed on three sides by the walls of the elongated chamber, the first of said walls being electrically conductive and further including a substantially planar electrically conductive plate forming a closure for the major portion of the open side of said chamber thereby forming a first portion of the exit channel between the end of said plate and one of said walls of said chamber.

In a further aspect of the present invention, the wire is located closer to said first one of said walls and to said planar conductive plate than to any of the other walls of said cavity.

In a further aspect of the present invention the coating is present on the surface of the planar electrically conductive closure plate.

For a better understanding of the invention as well as other aspects and further features thereof reference is had to the following drawings and descriptions.

DESCRIPTION OF THE PREFERRED EMBODIMENT

Figure 1:
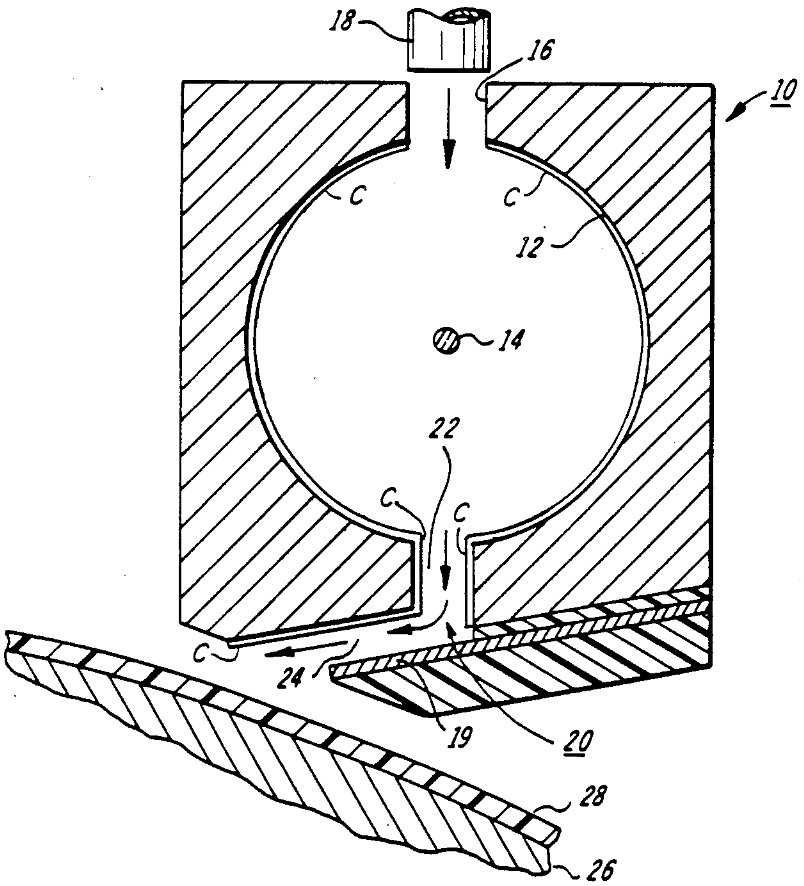
FIG. 1 is a partial sectional elevation view showing one embodiment of a fluid assisted ion projection printing head useful in the practice of the present invention. The coating according to the present invention is indicated on those surfaces labeled C.
Figure 2:
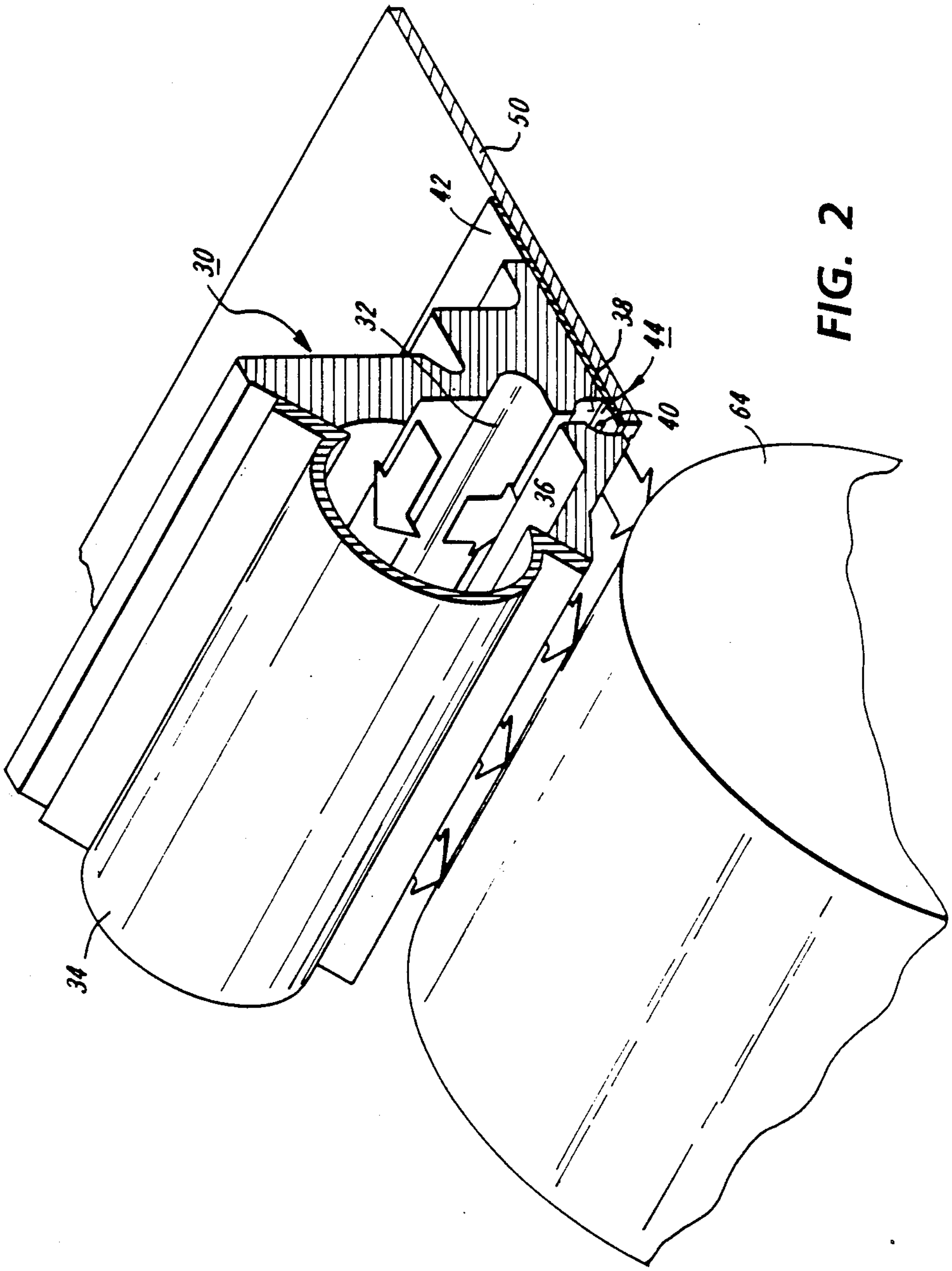
FIG. 2 is a perspective view showing a preferred embodiment of ion projection printing head useful in the practice of the present invention.
Figure 3:
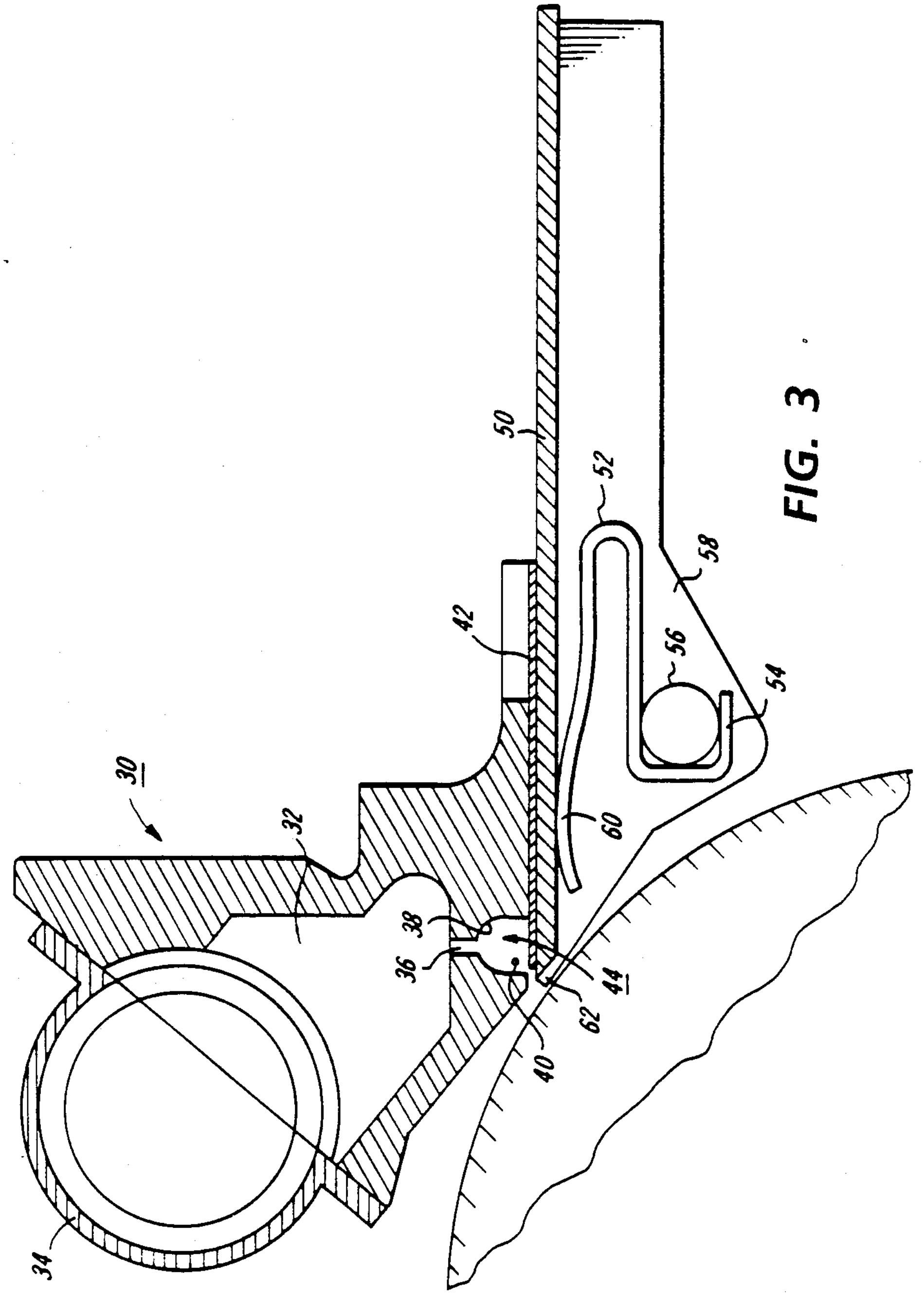
FIG. 3 is a sectional elevation view showing an alternative embodiment of ion projection printing head useful in the practice of the present invention.

With particular reference to the drawings, there is illustrated in FIG. 1 a fluid flow assisted ion projection printing head 10 of the form described in U.S. Pat. Nos. 4,463,363 and 4,524,371. Within the housing 10 is an ion generation region including an electrically conductive cylindrical cavity 12, a corona wire 14 extending substantially coaxially in the cavity to which a high potential source (not shown) is connected. A source of reference potential (also not shown) is connected to the housing. Fluid transport material, such as air, is delivered into the cavity 12 through an axially extending inlet channel 16, from a suitable source, schematically represented by tube 18. An axially extending exit channel 20 conducts the transport fluid and the ions entrained therein from the corona cavity 12 to the exterior of the printing head 10 via a bent path comprising a cavity exit region 22 and an ion modulation region 24.

The ions allowed to exit the printing head come under the influence of an electrically conductive acceleration electrode 26 which attracts them in order that they may be deposited upon the surface of dielectric layer 28 coated thereon. A high potential electrical source (not shown), on the order of several thousand volts d.c. of a sign opposite to that of the corona potential is connected to the acceleration electrode. Typically, the diameter of the ion generation cavity 12 has been on the order of 125 mils (0.125 inch). The surfaces with lead lines to reference character "C" are those which are coated in the practice of the present invention as will be discussed hereinafter. Typically, such a printing head would be manufactured in two halves and assembled together as one piece.

Turning now to FIGS. 2 through 5, there is illustrated a preferred embodiment of the present invention wherein the printing head is a one piece casting of an electrically conductive material such as for example aluminum. The upper portion of the printer head 30 comprises a plenum chamber 32 to which is secured a fluid delivery casing 34. An entrance channel 36 receives the low pressure fluid (preferably air) from the plenum chamber and delivers it to the ion generation cavity 38. The entrance channel should have a large enough cross-sectional area to insure that the pressure drop therethrough will be small. Cavity 38 has a generally U-shaped cross-section, with its three sides surrounding a corona wire 40. Suitable wire mounting supports are provided at opposite ends of the housing for mounting the wire at a predetermined location within the cavity. By mounting the wire ends on eccentric supports, relative to the housing, some limited adjustment of the wire location is made possible. A planar conductive plate 42, typically 12 mils thick, closes the major portion of the U-shaped cavity, forming an ion generation chamber 44 and leaving a cavity exit region 46 between the end of the conductive plate and the adjacent cavity wall 48. It should be apparent that although a head of this construction is also formed of two parts, only one has features thereon and the other is featureless. Therefore, the cost of manufacturing, to enable assembly to tight tolerances, is greatly minimized.

A planar substrate 50, typically 40 mils thick, upon which the electronic control elements are supported, is held adjacent the conductive plate 42 by an elongated spring clip 52. The spring clip 52 extends substantially across the head and is held in place by a mounting end 54 secured upon a rod 56 which spans the head from end-to-end in side plates 58 (only one shown). A force applying end 60, of the spring clip, urges the planar substrate 50 and the conductive plate 42 against the head body. The spring clip 52 should exert sufficient force to flatten irregularities in both the substrate 50 and the conductive plate 42 in order to ensure a uniform ion current output from end-to-end across the head. A force of two pounds works satisfactorily. A pair of extensions on the side plates for wiping shoes 62 (only one shown) which ride upon the outboard edges of the image receptor 64 so that the proper spacing is established between the head and the image receptor.

When properly positioned on the head, by means of suitable locating lugs (not shown), the conductive plate 42 and the substrate 50 are each cantilever mounted so that they define, in conjunction with the head, an exit channel 66 including the cavity exit region 46 (about 10 mils long) and an ion modulation region 68 (about 20 mils long). Air flow through the head is generally represented by the arrows in FIG. 2 which illustrate the entry of air through the fluid delivery casing 34 and the plenum chamber 32, into the ion generation chamber 44 through entrance channel 36 and out of the ion generation chamber through exit channel 66.

Figure 4:
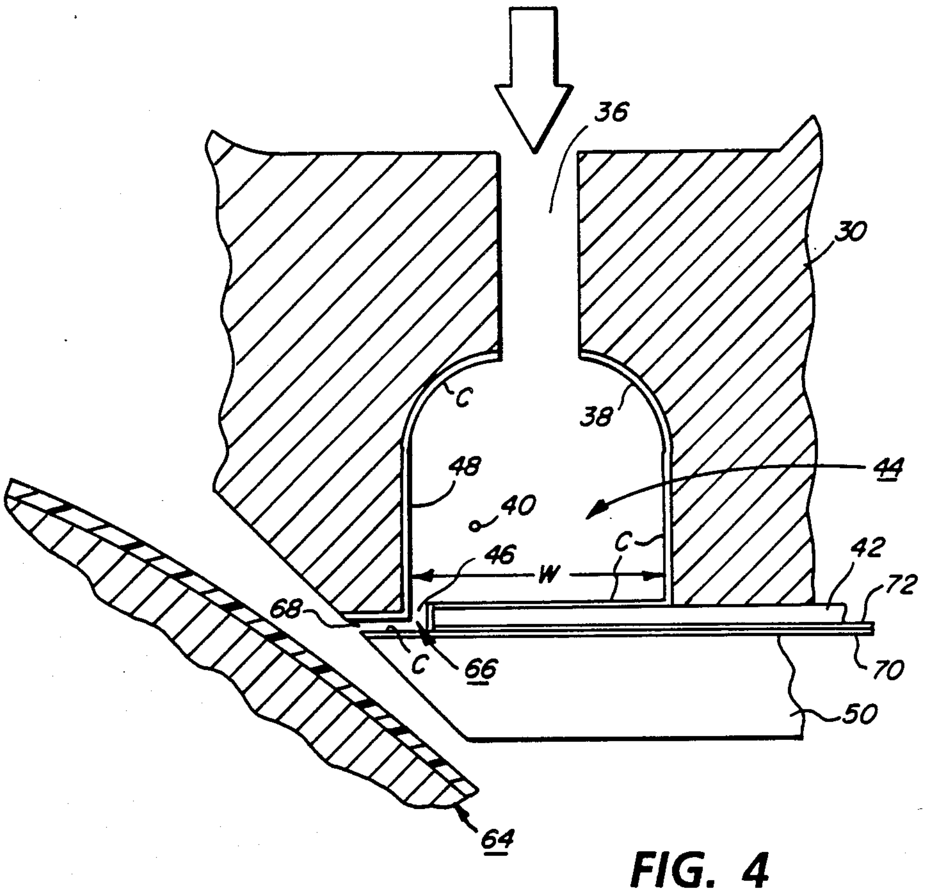
FIG. 4 is an enlarged sectional view showing a preferred embodiment useful in the practice of the present invention. The surfaces labeled with a "C" are those surfaces which have the coating applied to them according to the present invention.

In FIG. 4 the features of the ion generation chamber 44 are most readily observable. In this enlarged view, it can be seen that two layers are interposed between the planar substrate 50 and the conductive plate 42. Preferably the substrate is a large area marking chip comprising a glass plate upon which are integrally fabricated thin film modulating electrodes, conductive traces and transistors. This large area chip is fully described in U.S. Pat. No. 4,584,592 entitled "Marking Head For Fluid Jet Assisted Ion Projection Imaging Systems" (Hsing C. Tuan et al.) assigned to the same assignee as the present invention. All the thin film elements are represented by layer 70. An insulating layer 72 overcoats the thin film layer to electrically isolate it from the conductive plate.

Figure 5:
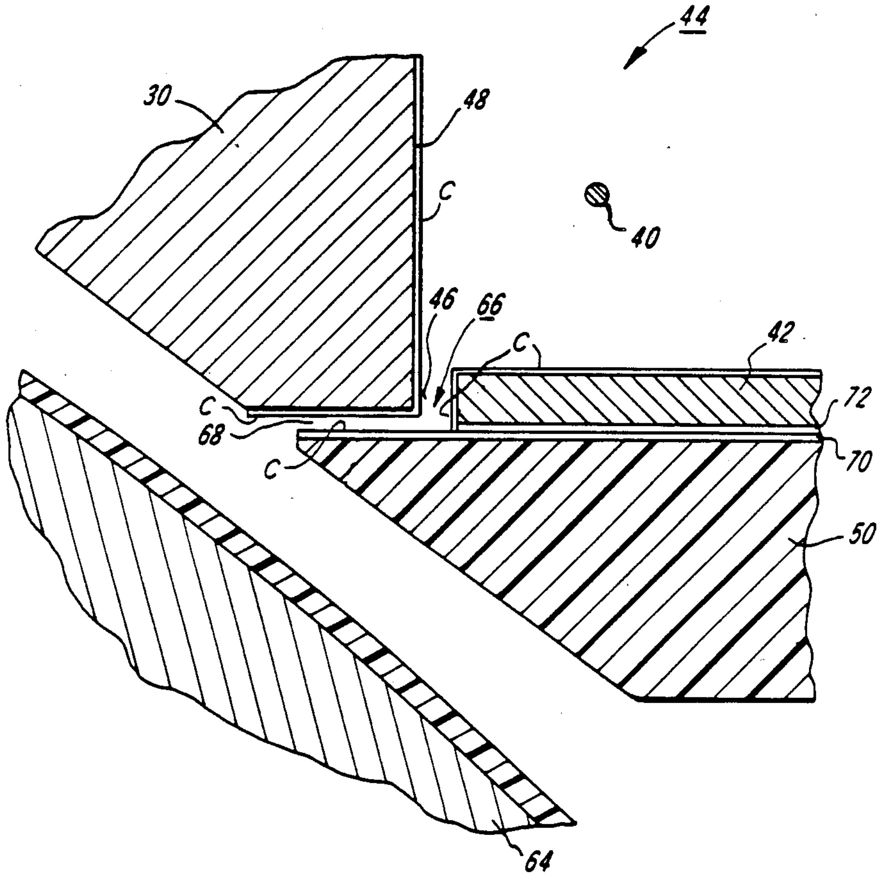
FIG. 5 is a further enlarged sectional elevational view of a preferred embodiment of the fluid assisted ion projection printing head useful in the practice of the present invention. The surfaces labeled "C" are those surfaces coated according to the present invention.

In FIG. 5, a further enlargement of a portion of the ion generation chamber 44 more clearly illustrates the corona generation area. Placement of the corona wire 40 is preferably about the same distance from the cavity wall 48 and from the conductive plate 42, and closer to these chamber walls than to the remaining cavity walls. We have found that such an orientation will yield higher corona output currents than heretofore made possible with a cylindrical ion generation chamber of comparable size. The width "w" across the cavity 38 is also about 125 mils but the wire 40 is spaced only about 25 mils from each of the conductive walls 48 and 42 (i.e., less than half the distance between the wire and the walls of the conventional cylindrical chamber). In FIG. 5, the great bulk of the ions will flow to the adjacent walls, although the cavity walls remote from the wire will attract some ions. However, it is only those ions following the lines of force into the cavity exit region 46, and those in close proximity, which will be driven out of the ion generation chamber 44. FIG. 5 surfaces with lead lines to reference character "C" are those which are coated in the practice of the present invention.

According to the present invention, an elongated ion generation chamber is formed in an electrically conductive metal typically by a die casting procedure wherein either one die casting is obtained or two matting die castings are obtained and subsequently joined together. While any suitable electrically conductive metal may be applied, aluminum is preferred because of its cost relatively low, light weight and porous surface which lends itself to being coated. The surfaces of the printing head that are effected by extended exposure to the chemistry of the corona discharge are coated with a substantially continuous thin conductive film of aluminum hydroxide containing conductive particles. Preferably the aluminum hydroxide is applied to the surfaces to be coated in aqueous media providing a somewhat gelatinous coating which is subsequently readily dehydrated by driving off the water. The adherent film formed on drying is believed to exist as the unhydrated aluminum oxide, a hydrated oxide or aluminum hydroxide or mixtures thereof. The film forming properties may be improved by the addition of small amounts of water soluble binders such as polyvinylpyrolidone or polyvinyl alcohol. One percent by weight of solids may be adequate without imparing water resistance of the dry film. To impart the desired conductivity to the film, it also contains a conductive non-reactive filler such as graphite which has a maximum dimension less than 5 micrometers. Graphite is the preferred filter since in addition to being unreactive when subject to buffing action it burnishes nicely thereby creating a more uniform surface, one to which contaminants cannot securely adhere and therefore easily cleaned to renew the surface.

Typical formulations to be applied to the printing head comprise aluminum oxide-hydrate and conductive filler such as graphite in a weight ratio of from about 1.5 to about 2.2 of aluminum oxide-hydrate to graphite dispersed in aqueous medium to provide from about 10% to 30% by weight solids. A particularly preferred formulation comprises by weight 77.5 percent water, about 14.5 percent aluminum oxide-hydrated and about 7 percent graphite and about 1 percent polyvinylpyrollidone and has a PH of 7.

The substantially continuous thin conductive dry film of aluminum hydroxide may be formed on the surface to be created by applying an aqueous solution or dispersion as a thin film thereto. Upon heating the liquid films dehydrates to provide a strong rigid inorganic adhesive bond to the substrate. Typically, the films can be applied to a previously degreased head by spraying or brushing as with a paint or by dip coating so as to provide a coherent film on the surface to be cooled. Preferably, the film is applied to the printing head by masking the areas not to be coated and spraying the unmasked portions. Typically, the film is applied in a thickness of from about 0.3 to about 1 mil and preerably 0.5 mil as a substantially uniform continuous layer without pores. The film may be applied in a single layer or in multiple layers. Following coating the coated portions of the printing head may be subjected to a buffing or burnishing action to provide more uniform surface.

The aluminum hydroxide film containing conductive particles such as graphite provides a substantially unreactive protective coating on the printing head that does not form an insulating layer when exposed to the chemistry of the corona discharge within and exiting from the printing head. It has been observed without explanation that the ammonium nitrate crystals previously obtained with printing heads made from bare stainless steel or bare aluminum do not occur to any substantial or functionally inhibiting degree. Furthermore, a stable coating which is capable of being brushed or burnished to provide a very smooth surface for the printing head is obtained.

To test the efficiency of the substantially continuous thin conductive dry film of aluminum hydroxide according to the present invention, printing heads were evaluated in a fluid flow assisted ion projection printing system test fixture. Each of the printing heads were two-piece cast aluminum heads 4" long having a general configuration as illustrated in FIG. 1 in that the corona wire was placed in the center of the discharge chamber. The first head was an uncoated aluminum head which had a printing lifetime of about four hours after which a perceptible film is observed on the printing head and the total corona output current drops due to the insulating nature of the film. The second head was gold plated in the areas indicated by "C" in FIG. 1 which had a lifetime of about 12 hours after which insulating ammonium nitrate crystals were observed. The third head was degreased and coated with Electrodag 121, an aqueous dispersion of semicolloidal graphite in an organic binder which cures at 350° C. in one hour to form a hard conductive coating and which is available from Achesion Colloid Company, Port Huron, Mich. The dispersion which is believed to contain 77.5 percent by weight water, 14.5 percent aluminum oxide hydrated and 7 percent by weight graphite, about 1 percent by weight polyvinylpyrollidone was applied by spraying through a mask to those portions labeled "C" in FIG. 1. After printing for more 350 hours of continuous operation under ambient humidity conditions, no film buildup was perceived nor were there other signs of deterioration.

Thus, according to the present invention, a fluid flow assisted ion projection printing head having a long life with substantially reduced cost is provided.

All the patents referred to herein are hereby incorporated by reference in their entirety in the instant specification.

While the invention has been described with reference to specific embodiments, it will be apparent to those skilled in the art that many alternatives, modifications and variations may be made. It is intended to embrace such modifications and alternatives as may fall within the spirit and scope of the appended claims.

I claim:

1. A fluid flow assisted ion projection printing head comprising:
- an electrically conductive metal body defining an elongated ion generation chamber,
- a conductive corona wire supported within said chamber for generating ions,
- an entrance channel in the body for introducing transport fluid to said chamber,
- an exit channel at least a portion of which is defined by the body for directing transporting fluid with entrained ions from said chamber,
- modulation means for neutralizing ions in selected portions of the exiting entraining fluid, and
- said printing head having substantially all surfaces thereof affected by extended exposure to the chemistry of the corona discharge coated with a substantially continuous thin conductive film of aluminum hydroxide containing conductive particles.

2. The printing head of claim 1, wherein said film is from 0.3 to about 1 mil in thickness.

3. The printing head of claim 1, wherein the aluminum hydroxide film exists as the unhydrated oxide, a hydrated oxide, aluminum hydroxide or mixtures thereof.

4. The printing head of claim 1 wherein said conductive particles are graphite particles having a maximum dimension less than 5 micrometers.

5. The printing head of claim 1 wherein said electrically conductive metal is aluminum.

6. The printing head of claim 1 wherein said body is made of one piece.

7. The printing head of claim 1 wherein the coating is present on the surface of the ion generation chamber and at least a portion of the exit channel.

8. The printing head of claim 1 wherein said corona wire extends in the direction of said elongated chamber and is enclosed on three sides by the walls of said elongated chamber, a first one of said walls being electrically conductive and further including a substantially planar electrically conductive plate forming a closure for the major portion of the open side of said chamber thereby forming a first portion of the exit channel between the end of said plate and one of said walls of said chamber.

9. The printing head of claim 8 wherein said modulation means comprises:
- a substantially planar member supporting electronic control elements, said planar member being held against said planar conductive plate and separated therefrom by an intermediate dielectric member, said planar member including a cantilevered portion spaced from said body for defining an extension of said exit channel, and
- wherein said wire is located closer to said first one of said walls and to said planar conductive plate than to any of the other walls of said cavity.

10. The printing head of claim 8 wherein the coating is present on the surface of the planar electrically conductive closure plate.

11. The printing head of claim 4, wherein said film is from about 0.3 to about 1 mil in thickness.

12. The printing head of claim 4, wherein the aluminum hydroxide film exists as the unhydrated oxide, a hydrated oxide, aluminum hydroxide or mixtures thereof.

13. The printing head of claim 4 wherein said electrically conductive metal is aluminum.

14. The printing head of claim 4 wherein said body is made of one piece.

15. The printing head of claim 4 wherein the coating is present on the surface of the ion generation chamber and at least a portion of the exit channel.

16. The printing head of claim 4 wherein said corona wire extends in the direction of said elongated chamber and is enclosed on three sides by the walls of said elongated chamber, a first one of said walls being electrically conductive and further including a substantially planar electrically conductive plate forming a closure for the major portion of the open side of said chamber thereby forming a first portion of the exit channel between the end of said plate and one of said walls of said chamber.

17. The printing head of claim 15 wherein said modulation means comprises:
- a substantially planar member supporting electronic control elements, said planar member being held against said planar conductive plate and separated therefrom by an intermediate dielectric member, said planar member including a cantilevered portion spaced from said body for defining an extension of said exit channel, and
- wherein said wire is located closer to said first one of said walls and to said planar conductive plate than to any of the other walls of said cavity.

18. The printing head of claim 15 wherein the coating is present on the surface of the planar electrically conductive closure plate.

* * * * *